United States Patent Office 3,561,289
Patented Feb. 9, 1971

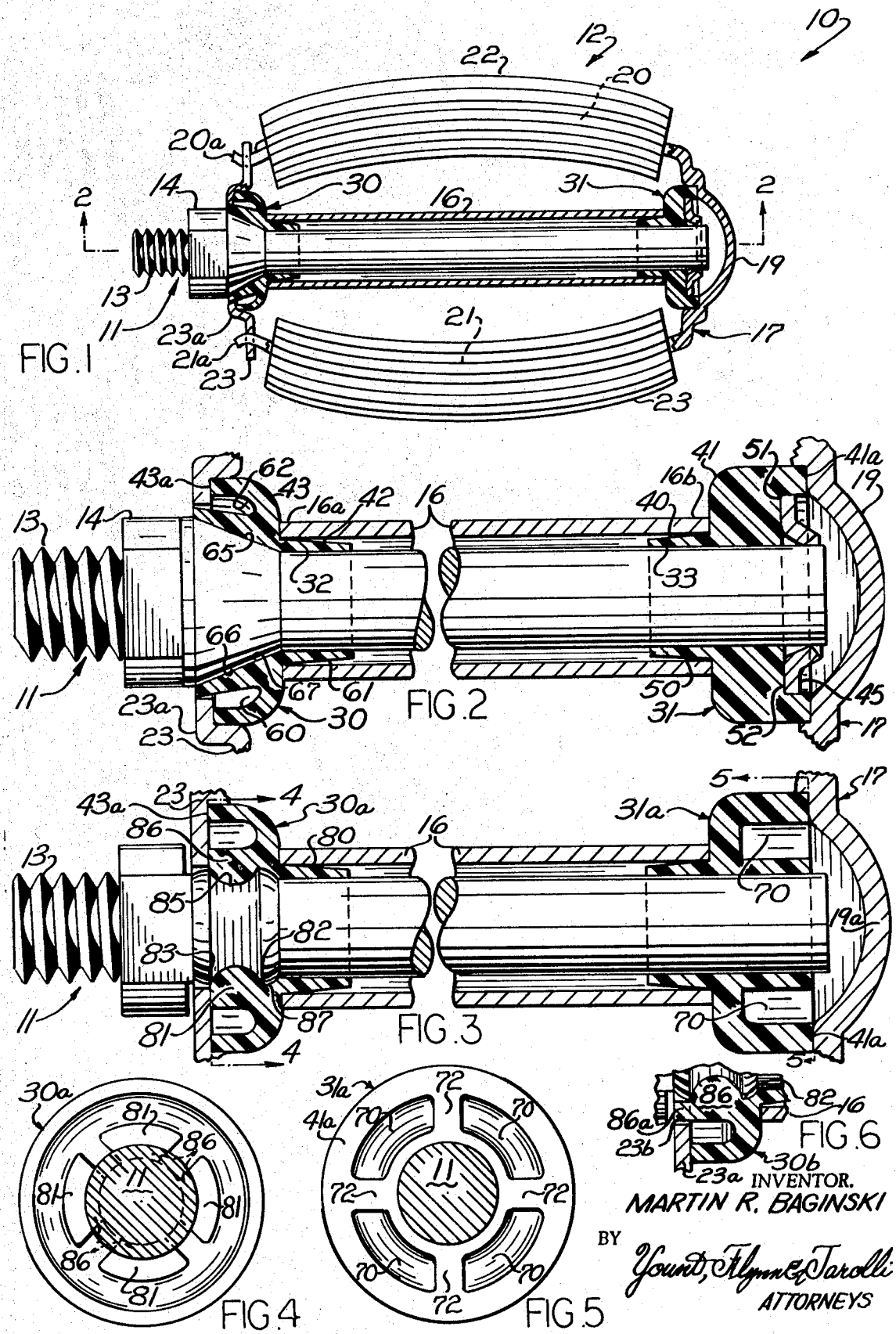

---

3,561,289
BICYCLE PEDAL
Martin R. Baginski, Austinberg Township, Ashtabula, Ohio, assignor to Ashtabula Bow Socket Company, Ashtabula County, Ohio, a corporation of Ohio
Filed Feb. 3, 1969, Ser. No. 796,071
Int. Cl. G05g 1/14
U.S. Cl. 74—594.4          20 Claims

ABSTRACT OF THE DISCLOSURE

A bicycle pedal comprises a pedal axle and a pedal body. The pedal body includes pedal body members which are supported on the pedal axle and a plastic bearing member which functions as a means for supporting the pedal body on the pedal axle. The plastic bearing member is a part of the pedal body and has a portion which is axially disposed between parts of the pedal body member.

---

The present invention relates to a bicycle pedal, and particularly relates to a bicycle pedal which includes a pedal axle, a pedal body and means for supporting the pedal body on the pedal axle for relative rotation therebetween.

In the design of bicycle pedals, certain factors are important from both a commercial and operational standpoint. These factors include the life of the pedal and parts thereof, the spin characteristics of the pedal, and the amount of noise produced by relative rotation of parts of the pedal. Moreover, pedal designs require a construction which provides for the transmission of force loadings which are applied to the pedal body to be transmitted from the pedal body to the axle of the pedal and subsequently through the axle to the frame of the bicycle. An example of such a force loading is the shock loading on the pedal body when a bicycle is dropped on the ground. While all of these various functional requirements are important in the design of a pedal, the design should also be structurally simple and relatively inexpensive for commercial purposes.

The principal object of the present invention is to provide a new and improved bicycle pedal which includes a pedal axle and a pedal body supported for rotation relative thereto and which is simple in construction, but yet has excellent spin characteristics, a relatively quiet operation, and which is constructed so as to effectively transmit forces applied to the pedal body to the axle of the pedal.

A further object of the present invention is the provision of a new and improved bicycle pedal which includes a pedal body and a pedal axle and wherein a plastic bearing comprises a part of the pedal body and supports the pedal body on the pedal axle for rotation relative thereto, thereby providing a bicycle pedal having excellent spin characteristics and a relatively silent operation.

A still further object of the present invention is the provision of a new and improved bicycle pedal which includes a pedal axle and a pedal body including a plastic bearing member supporting the pedal body on the pedal axle, and wherein the plastic bearing member has a portion which is disposed axially between two parts of the pedal body, so as to be retained as a part of the pedal body in compression between the parts.

Another object of the present invention is to provide a new and improved bicycle pedal having a pedal body and a pedal axle and a plastic bearing member forming a part of the pedal body and which plastic bearing member has a portion which engages a part of the axle so as to transmit forces applied to the pedal body to the axle of the pedal.

Still another object of the present invention is the provision of a new and improved pedal having a pedal body and a pedal axle and a plastic bearing member which forms a part of the pedal body which functions to lock the pedal body on the axle and resist axial movement of the pedal body relative to the axle.

A further object of the present invention is the provision of a new and improved bicycle pedal having a pedal body and a pedal axle and wherein means is provided for resisting axial movement of the pedal body relative to the axle, and wherein this means includes cooperating locking portions on the axle and body which move generally radially of the pedal axle in order to provide for assembly of the pedal body on the pedal axle.

Further objects and advantages of the present invention will be apparent to those skilled in the art to which it relates from the following detailed description of preferred embodiments thereof made with reference to the accompanying drawings in which:

FIG. 1 is a plan view of a bicycle pedal embodying the present invention;

FIG. 2 is a fragmentary cross-sectional view of the pedal body of FIG. 1, taken along the section line 2–2 thereof;

FIG. 3 is a fragmentary, axial cross-sectional view of a pedal embodying the present invention but of a modified construction;

FIG. 4 is a fragmentary, radial cross-sectional view of the pedal shown in FIG. 3 and taken along line 4–4 thereof;

FIG. 5 is a fragmentary, radial cross-sectional view of the pedal shown in FIG. 3 and taken along line 5–5 thereof; and FIG. 6 is a fragmentary sectional view of a still further modification of the present invention.

The present invention provides and improved bicycle pedal having an extremely long life, silent operation, excellent spin characteristics, and yet is simple in construction and assembly and readily provides for the transmission of axial forces from the pedal body to the axle of the pedal. The present invention may be applied to pedals of a wide variety of construction and designs and for purposes of illustration is described, as illustrated in the drawings, as applied to a bicycle pedal 10, shown in FIG. 1.

The bicycle pedal 10 includes a pedal axle 11 and a pedal body 12 supported for rotation relative to the pedal axle 11. The pedal axle 11 comprises a rod member having a threaded portion 13 which is adapted to be threaded into the crank of the bicycle to which the pedal 10 is attached such that a bicycle rider may engage the pedal with his foot to provide a propelling force thereto. A suitable nut 14 is formed integral with the axle 11 so as to be engaged by a wrench for facilitating threading of the axle 11 to the crank.

The pedal body 12 in the illustrated embodiment of the invention includes a central tube member 16 which is coextensive with a portion of the axle 11 and encircles the axle 11. The pedal body 12 also includes a tread support member which, in the illustrated embodiment, comprises a bow frame member, generally designated 17. The bow frame member 17 includes an outboard portion 19 located at the outboard end of the pedal frame, that is, the end opposite the end adapted to be connected to the crank and a pair of bowed tread-supporting members 20 and 21, located on the opposite sides of the tube 16. In the illustrated embodiment treads 22, 23, respectively, are supported on the bow frame portions 20, 21, respectively.

The inboard ends 20a, 21a of the bow frame portions 20 and 21, respectively, are received in an end brace member 23 which has a central portion 23a which encircles the axle 11. The end portions 20a, 21a of the bow frame members 20, 21, respectively, extend through suitable apertures in the end brace member 23 and are bent thereon in order to hold the bow frame members 20 and 21 in assembled relation with the end brace member 23.

The pedal body member 12 also includes a pair of bearing members, generally designated 30 and 31, as best shown in FIG. 2. The bearing member 30 comprises the inboard bearing, and the bearing member 31 comprises the outboard bearing for the pedal body 12. The inboard bearing member 30 includes a central aperture 32 therethrough and the outboard bearing member 31 includes a central aperture 33 therethrough which are located in axial alignment so as to receive the axle 11 of the pedal. The bearings 30 and 31 support the pedal body 12 on the axle 11 for rotation relative thereto.

The outboard bearing member 31 comprises a central portion 40 which encircles the axle 11 and a radially projecting portion 41 which projects radially from the central portion 40. The inboard bearing 30 also includes a central portion 42 which encircles the axle 11 and a radially projecting portion 43 which projects radially from the central portion 42.

The central portion 40 of the outboard bearing 31 has a tapered surface 50 thereon for facilitating assembly of the outboard bearing 31 with the tube 16. The radially projecting portion 41 of outboard bearing 31 has a recess 51 to receive a retaining ring 45. When positioned in an assembled position on the axle 11, the retaining ring 45 bears against outboard surface 52 to prevent the pedal body from becoming disengaged from the axle 11 in an outboard axial direction.

The central portion 42 of the inboard bearing 30 also has a tapered surface portion 61 for facilitating assembly of the tube 16 thereon. The inboard bearing 30 has a series of recesses 60 therein which are spaced circumferentially around the radial portion 43 of the bearing and which are separated by radially extending web portions 62. The function of these recesses 60 is to provide for a uniform cross-sectional formation of the portions of the bearing during the injection-molding operation in which the bearings are constructed. These recesses do not sacrifice structural strength of the bearing and do not detrimentally affect the operation of the bearing. It should be apparent that the plastic bearings may be produced by many manufacturing processes other than the injection-molding process.

The axle 11 is provided with a shoulder 65 which has a tapered surface 66. The inboard bearing 30 is provided with a complementary tapered surface 67. The axle is assembled with the pedal body 12 so that the bearing surface 67 engages the shoulder 65.

It should be pointed out that the tapered surface 67 has sufficient taper to eliminate the problem of the inboard bearing member 30 locking with the shoulder 65 of axle 11 which would prohibit rotational movement of the bearing 30 and consequently pedal body 12 relative to the axle 11. Moreover, these complementing surfaces 66 and 67 also provide for restraining the pedal body 12 in the inboard axial direction and allow for distribution of a shock loading over an increased area, as compared with a non-tapered surface. In addition, it should be noted that the tapered surface 66 need not be formed about the entire circumferential extent to provide a sufficient bearing surface.

In the assembly of the pedal 10, the end brace member 23 is positioned on the pedal axle 11 and the inboard bearing member 30 is positioned with its inboard surface portion 43a of the radially projecting portion 43 in engagement with the end brace member 23. Subsequently, the central tubular portion 16 and the outboard bearing 31 are positioned in their respective relative positions such that the central portions 40 and 42 of the bearing members are encircled by the central tubular portion 16 and retained thereby. The retaining ring 45 is positioned on the outboard end of axle 11 such that the bearings 30 and 31 and tube 16 are retained on the axle 11 in a relatively fixed axial relationship therewith. It should be apparent that the outboard end of the axle 11 may be provided with circumferential grooves to facilitate the gripping action of the retaining ring 45 on the axle 11. The bow frame 17 is then fitted or positioned so as to locate the end portions 20a, 21a of the tread support portions 20, 21, respectively, in the openings in the end brace 23.

The bow frame 17 having treads 20 and 21 positioned thereon is moved axially so that the outboard portion 19 of the bow frame 17 engages the outboard surface 41a of the radially projecting portion 41 of the outboard bearing 31. When the bow strap 17 has been so positioned, the end portions 20a and 21a of the bow frame members 20 and 21, respectively, extend through the suitable apertures in end brace member 23. The bow strap 17 is then urged toward the end brace member 23 which consequently forces the bearings 31 and 30 into compression between the respective parts and the frame between which they are located. The ends 20a and 21a of the bow frame are then bent so as to hold the pedal body as a unitary construction thereby frictionally engaging the bearings 30 and 31 such that they become part of the pedal body 11.

As a result of this construction, the inboard and outboard bearings 30 and 31 respectively are maintained in compression between the frame portions of the pedal 10. More specifically, the inboard bearing 30 is maintained in compression between the end brace member 23 and the inboard end 16a of the tube 16. The outboard bearing 31 is maintained in compression between the outboard member 19 of the bow frame 17 and the outboard end 16b of the tube 16. It should be apparent from the above that the pedal body 12 comprises a unitary construction which includes the inboard and outboard bearings 30 and 31 respectively in compression between parts of the frame of the pedal body.

When the bicycle pedal 10 of the construction illustrated in FIGS. 1 and 2 is applied to a bicycle, the bearings 30 and 31 rotate with the pedal body relative to the axle and, in view of the fact that the bearings 30 and 31 are made of a plastic material, they are relatively silent in operation when rotation of the pedal body 12 relative to the axle 11 occurs. Moreover, due to the fact that the inboard and outboard bearings 30 and 31 are of plastic material, no lubrication thereof is required. Furthermore, the bearings being of a plastic construction have a long life and are reasonable inexpensive to manufacture so as to provide not only a bicycle pedal having a long life, but also one which is relatively inexpensive to manufacture.

Moreover, from the above, it should be noted that any axial shock forces which are applied to the bow frame 17, for example, when a bicycle falls over, will be transmitted through the bearing 31, tube 16, and bearing 30, to the shoulder 65 of the axle 11. The axle 11, of course, will transmit those shock forces to the crank which will in turn transmit the force to the frame of the bicycle. As a result, the bearings 30 and 31 not only are in compression as a result of the assembly thereof, but also effect or transmit the axial shock forces which are applied to the pedal body, and are effective to spread such axial shock loadings over an increased area to allow the pedal to have a longer life.

The modified construction of the present invention which is illustrated in FIG. 3 is generally similar to the construction illustrated in FIGS. 1 and 2. However, the pedal construction illustrated in FIG. 3 has a different construction of the inboard bearing 30 which eliminates the need for a retaining ring, such as the retaining ring illustrated in FIG. 2. In view of the fact that the main structural distinction between the pedal construction of FIG. 3 and that of FIG. 2 resides in the construction of the inboard bearing 30 and its cooperation with the axle 11, only this construction will be described hereinbelow. For the remaining portions of the pedal shown in FIG. 3, the same reference numerals will be utilized as were utilized with respect to the construction shown in FIG. 2.

The inboard bearing 30 in the construction illustrated in FIG. 3 includes a central bearing portion 80 which encircles the axle 11 and which supports the tube 16. The bearing 30 also includes a locking portion 81 which cooperates with locking portions 82 and 83 of the axle 11 to resist axial movement of the pedal body 12 relative to the axle 11 in both inboard and outboard directions. The locking portions 82 and 83 on the pedal axle 11 comprise annular projections which project radially of the axle 11 and are spaced axially apart so as to define a recess 85 therebetween. The cooperating locking portion 81 on the inboard bearing 30 comprises a plurality of projections 86 which project inwardly of the inboard bearing 30, and which are circumferentially separated. The projections 86 are received in the recess 85 and are shaped so as to engage the surfaces defining the adjacent surfaces of the projections 82 and 83 which define the recess 85 when the pedal body 12 is in assembled relation with the axle 11. The engaging surfaces of the projection 86 and the surfaces of the projections 82, 83 must be designed and shaped so as to provide a locking action therebetween so as to resist axial forces tending to effect axial movement of the pedal body 12 on the axle 11. Any axial forces applied to the pedal body 12, tending to move the pedal body 12 to the left relative to the axle 11, as viewed in FIG. 3, will result in the projections 86 tending to ride up the adjacent surface of the projection 83 on the axle 11 resulting in a radially outward movement of the projections 86 relative to the axle 11. This radial movement constitutes an elastic bending of the inboard bearing 30 and, specifically, of the portions 86 thereof. Any axial force tending to move the pedal body 12 to the right, as viewed in FIG. 3, relative to the axle 11 may result in radially outward movement of the projections 86 relative to the axle 11. This radial movement will be effected due to the cooperative relationship between the engaging surfaces of the projection 86 and locking portion 82 on the axle 11 and will constitute an elastic bending of the projections 86. These locking projections 86 are designed such that after normal shock and force loadings on the pedal body, the locking projections will return to their original position without changing the favorable advantages of a pedal of the immediate invention.

In view of the fact that the bearing 30 has the projections 86 which cooperate with the projections 82 and 83 to effect a locking of the bearing 30 to the axle, a retaining ring is not necessary to hold the pedal body 12 axially on the axle 11. Accordingly, the retaining ring 45 which was utilized in the pedal construction described above and illustrated in FIG. 2 is eliminated from the pedal construction of FIG. 3. Of course, any axial forces or shock loadings applied to the pedal body 12 in the construction illustrated in FIG. 3 will be similarly transmitted to the axle 11 in much the same manner as that described above in connection with FIG. 2. More specifically, any axial force which is applied to the pedal body 12 will be transmitted through the bearing 31, tube 11, bearing 30, and to the projections 82 and 83 on the axle 11.

It should be apparent that such a locking device could be incorporated in the outboard bearing 31a and the same favorable characteristics obtained.

The outboard bearing 31a has a series of recesses 70 therein which are spaced circumferentially around the radial portion 41a of the bearing and which are separated by radially extending web portions 72. The function of these recesses 70 is to provide for a uniform cross-sectional formation of the portions of the bearing during the injection-molding operation in which the bearings are constructed and decrease the amount of material required. These recesses do not sacrifice structural strength of the bearing and do not detrimentally affect the operation of the bearing. It should be understood that the pedal construction as shown in FIG. 2 could be modified to include such an outboard bearing 31a. Furthermore, recess 51 could be incorporated in bearing 31a to further modify such a construction.

The bicycle pedal construction of FIG. 3 is assembled in a manner similar to that described above in connection with FIG. 2. However, after the end brace member 23 is positioned on the axle 11, the inboard bearing 30 is applied thereto. When the inboard bearing 30 is moved axially relative to the axle 11, the projections 86 engage the projection 82 on the axle and are biased or moved outwardly thereof as the bearing 30 and axle 11 are moved axially relative to each other. This outward movement of the projections 86 enables the bearing 30 to move into the position illustrated in FIG. 3 and, when so positioned, the projections 86 snap into the recess 85. It should be apparent, of course, that when in this position, the projection 82 on the axle is received in the recess 87 in the bearing 30.

After the inboard bearing 30 is positioned on the axle 11, the tube 16 and outward bearing 31a are positioned thereon. As noted hereinabove, a retaining ring is not necessary in this construction. The bow strap construction is then assembled with the end brace member 23 and this assembly is effected in the manner described hereinabove wherein the bow strap 17 is positioned relative to the bearing 31a so that the outboard portion 19 thereof engages the outboard end surface 41a of the bearing 31a and the end brace member 23 is positioned in engagement with the surface 43a of the inboard bearing 30. When these members are so positioned, the bow frame 17 is suitably secured to the end brace member 23, as described hereinabove in connection with FIG. 2.

The modification of the present invention which is illustrated in FIG. 6 is similar to that illustrated in FIG. 3. The inboard bearing member 30 is provided with projections 86 thereon which cooperate with projections 82 and 83 to effect locking of the pedal body 12 on the pedal axle 11. However, the projections 86 of the inboard bearing 30 in the modification shown in FIG. 6 include portions 86a which project into the opening in the stud end brace 23. These projections engage the surface 23b defining the opening in the stud end brace when assembled. As a result, the stud end brace functions to positively resist radial movement of the projections 86 relative to the axle 11. This construction, as a result, ensures that the projections 86 will not move radially out of the recess 85 in the axle 11.

It should be apparent from the above that applicant has provided a highly improved bicycle pedal which is extremely silent in operation and has excellent spin characteristics. These advantages flow from the fact that plastic bearings are utilized in the construction. These plastic bearings, moreover, are associated with the construction in such a manner that they are formed as an integral unit with the pedal body and when in assembled relation therewith are in compression between portions of the pedal body. Moreover, the plastic bearing members above described are effective to transmit axial shock force loadings to the pedal axle.

Having described my invention, I claim:

1. A bicycle pedal comprising a pedal axle and a pedal body, said pedal body including first and second pedal body members and means supporting said pedal body for rotation relative to said pedal axle, said means supporting said pedal body for rotation relative to said pedal axle including a plastic bearing member forming a part of said pedal body and disposed on said pedal axle and having a portion in compression between said first and second pedal body members, said plastic bearing member and said axle having self-locking cooperable portions which cooperate to resist axial movement of said pedal body relative to said axle.

2. A bicycle pedal as defined in claim 1 wherein said cooperating self-locking portions comprise cooperating projections on said bearing and said axle.

3. A bicycle pedal comprising a pedal axle and pedal body, said pedal body including first and second pedal body members adapted to be supported on said pedal axle and means supporting said pedal body for rotation relative to said pedal axle, said means supporting said pedal body for rotation relative to said pedal axle comprising at least one plastic bearing member on said pedal axle, said plastic bearing member having a first portion supporting a part of said first pedal body member and a second portion in engagement with said first and second pedal body members and located axially therebetween, said one plastic bearing member having a self-locking portion cooperable with a portion of said pedal axle to lock said pedal body on said pedal axle and resist axial movement of said pedal body relative to said pedal axle.

4. A bicycle pedal as defined in claim 3 wherein said self-locking portion of said plastic bearing comprises projections which extend radially from said bearing and which cooperate with radially extending projections on said pedal axle.

5. A bicycle pedal comprising a pedal axle and a pedal body, said pedal body including a plastic member secured thereto and at least in part encircling said pedal axle, said plastic member having a self-locking portion cooperable with a portion of said axle to lock said pedal body on said axle and resist axial movement of said pedal body relative to said axle.

6. A bicycle pedal as defined in claim 5 wherein said plastic member comprises a plastic bearing forming an integral portion of said pedal body and rotatable with said pedal body relative to said pedal axle.

7. A bicycle pedal as defined in claim 5 wherein said self-locking portion of said plastic member comprises radially extending projections which cooperate with radially extending projections on said pedal axle to effect a locking of said plastic bearing member thereon to prevent axial movement thereof relative to said pedal axle.

8. A bicycle pedal as defined in claim 7 wherein said projections on said plastic member are movable radially in order to be positioned between said projections on said pedal axle during assembly of said plastic member and said pedal axle.

9. A bicycle pedal comprising a pedal axle and a pedal body supported thereon, means for resisting axial movement of said pedal body relative to said pedal axle, said means including cooperating locking portions of said pedal axle and said pedal body effecting an axial locking engagement therebetween resisting axial movement of the pedal body relative to said pedal axle, said portions being relatively movable generally radially of said axle to effect said locking engagement and transmitting forces applied to said pedal body axially thereof to said pedal axle.

10. A bicycle pedal as defined in claim 9 wherein said cooperating portions on said pedal body comprise portions of a bearing member supporting said pedal body for rotation relative to said pedal axle and which portions are movable radially of said pedal axle during assembly of said bearing on said pedal axle.

11. A bicycle pedal as defined in claim 9 wherein said pedal body includes an end brace member having an opening therein, and said portions of said bearing member projection into said opening and engage said end brace member.

12. A bicycle pedal comprising a pedal axle, and a pedal body, said pedal body including first and second pedal body members and means supporting said pedal body for rotation relative to said pedal axle including a plastic bearing member forming a part of said pedal body and disposed on said pedal axle, said plastic bearing member having a first portion adjacent to said pedal axle and a second portion extending radially from said first portion and extending axially along said axle so that a space is defined between said second portion and said axle, one of said pedal body members having a portion which bears on the axial extension of said second portion to thereby distribute the load exerted on said pedal body.

13. A bicycle pedal as defined in claim 12, wherein said second portion of said plastic bearing member is in compression between said first and second pedal body members.

14. A bicycle pedal as defined in claim 12, wherein said first pedal body member comprises a tube member encircling said axle, said tube member having an end portion engaging one surface of said second portion and said second pedal body member comprises an end frame member engaging the opposite axial surface of said second portion of said plastic bearing member.

15. A bicycle pedal as defined in claim 12, wherein said plastic bearing member comprises the inboard bearing of said pedal body, said pedal body further including a second plastic bearing member forming the outboard bearing of said pedal body, said second bearing member including a central portion encircling said axle and a radially extending portion positioned between said first pedal body member and a third pedal body member.

16. A bicycle pedal as defined in claim 15, wherein said first pedal body member comprises a tube member encircling said axle and having one end engaging said plastic bearing member and another end engaging said second plastic bearing member.

17. A bicycle pedal as defined in claim 16, wherein said pedal axle has a shoulder portion thereon against which a surface of said inboard bearing bears and further including a retaining ring engageable with said outboard bearing on said pedal axle for holding said inboard bearing surface against said shoulder portion on said pedal axle.

18. A bicycle pedal as defined in claim 12, wherein said second portion extends radially from said first portion and axially therealong, so that a space is defined between said first and second portions, one of said pedal body members having a portion which bears on the axial extension of said second portion to thereby distribute the load exerted on said pedal body.

19. A bicycle pedal as defined in claim 12, wherein said pedal body further includes a third pedal body member and a second bearing member, said second bearing member positioned between said first pedal body member and said third pedal body member, said third pedal body member having a portion thereof contacting said second bearing member, said second pedal body member having a portion thereof contacting said plastic bearing member, said first pedal body member positioned between said plastic bearing member and said second bearing member, said second pedal body member and said third pedal body member secured to each other so that said plastic bearing member and said second bearing member are engaged by said first and second and first and third pedal body members respectively.

20. A bicycle pedal as defined in claim 12 wherein the axial extension extends circumferentially of said pedal axle and has a circumferentially extending bearing surface on which said one pedal body member bears, said one pedal body member having a portion which engages the end of the axial extension and which terminates short of the pedal axle.

References Cited

UNITED STATES PATENTS

| | | | |
|---|---|---|---|
| 1,352,446 | 9/1920 | Glanz | 74—594.4 |
| 1,600,010 | 9/1926 | Peace | 74—594.4 |

FOREIGN PATENTS

| | | | |
|---|---|---|---|
| 825,258 | 12/1959 | Great Britain | 74—594.4 |
| 1,271,858 | 8/1961 | France | 74—594.4 |
| 1,375,934 | 8/1964 | France | 74—594.4 |

M. CARY NELSON, Primary Examiner

F. D. SHOEMAKER, Assistant Examiner